United States Patent
Wilson et al.

(10) Patent No.: US 8,676,130 B2
(45) Date of Patent: *Mar. 18, 2014

(54) METHOD, SYSTEM AND MOBILE DEVICE FOR PRIORITIZING A DISCOVERED DEVICE LIST

(71) Applicant: Research In Motion Limited, Waterloo (CA)

(72) Inventors: Sean Elliott Wilson, Kitchener (CA); Christopher Pattenden, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/749,875

(22) Filed: Jan. 25, 2013

(65) Prior Publication Data

US 2013/0137375 A1    May 30, 2013

Related U.S. Application Data (63) Continuation of application No. 12/815,701, filed on Jun. 15, 2010, now Pat. No. 8,364,088, which is a continuation of application No. 11/693,385, filed on Mar. 29, 2007, now Pat. No. 7,747,223.

(51) Int. Cl.
  *H04B 17/00* (2006.01)
  *H04B 17/02* (2006.01)
  *H04B 1/38* (2006.01)

(52) U.S. Cl.
  USPC ...... 455/67.11; 455/41.2; 455/67.7; 455/134; 455/226.2; 455/566

(58) Field of Classification Search
  USPC ............... 455/67.11, 67.7, 134, 226.1–226.2, 455/226.4, 566, 41.2–41.3, 115.1, 115.3, 455/115.4
  See application file for complete search history.

(56) References Cited

U.S. PATENT DOCUMENTS

| | | | |
|---|---|---|---|
| 2,006,089 A * | 6/1935 | Tompkins | 47/11 |
| 6,006,089 A | 12/1999 | Sasaki et al. | |
| 6,842,460 B1 * | 1/2005 | Olkkonen et al. | 370/465 |
| 6,957,045 B2 * | 10/2005 | Haller et al. | 455/41.1 |
| 6,961,541 B2 | 11/2005 | Overy et al. | |

(Continued)

FOREIGN PATENT DOCUMENTS

| | | |
|---|---|---|
| CN | 1522503 A | 4/2004 |
| EP | 1322071 A2 | 6/2003 |

(Continued)

OTHER PUBLICATIONS

Japanese Office Action for Japanese Patent Application No. 2012-113470, dated Mar. 8, 2013.

(Continued)

Primary Examiner — Simon Nguyen
(74) Attorney, Agent, or Firm — Bereskin & Parr LLP/S.E.N.C.R.L., s.r.l.

(57) ABSTRACT

The described embodiments relate generally to methods, systems and computing devices, including at least a mobile device, for ordering a discovered device list according to a Received Signal Strength Indication (RSSI) of each device in the discovered device list. Thus, the discovered device list has at the top of the list the device that has the highest RSSI, with the remaining devices in the discovered device list presented in descending order of RSSI.

24 Claims, 6 Drawing Sheets

(56) References Cited

U.S. PATENT DOCUMENTS

| | | | |
|---|---|---|---|
| 6,999,791 B1* | 2/2006 | Ishikura et al. | 455/557 |
| 7,102,640 B1* | 9/2006 | Aholainen et al. | 345/440 |
| 7,272,407 B2* | 9/2007 | Strittmatter et al. | 455/500 |
| 7,313,392 B2* | 12/2007 | Cheng | 455/423 |
| 7,403,793 B2* | 7/2008 | Mauney et al. | 455/552.1 |
| 7,500,005 B2* | 3/2009 | Motoyama | 709/228 |
| 7,606,570 B2* | 10/2009 | Karaoguz et al. | 455/442 |
| 7,660,565 B2* | 2/2010 | Patel et al. | 455/132 |
| 7,668,570 B2* | 2/2010 | Watanabe et al. | 455/566 |
| 7,747,223 B2* | 6/2010 | Wilson et al. | 455/67.11 |
| 7,764,954 B2 | 7/2010 | Beyer, Jr. | |
| 8,152,066 B2 | 4/2012 | Adams et al. | |
| 8,364,088 B2 | 1/2013 | Wilson et al. | |
| 2004/0037247 A1 | 2/2004 | Ngo | |
| 2004/0102192 A1 | 5/2004 | Serceki | |
| 2004/0176117 A1 | 9/2004 | Strittmatter et al. | |
| 2004/0185876 A1 | 9/2004 | Groenendaal et al. | |
| 2005/0070335 A1 | 3/2005 | Jitsuishi | |
| 2005/0159107 A1 | 7/2005 | Mauney et al. | |
| 2005/0185615 A1 | 8/2005 | Zegelin | |
| 2005/0201300 A1 | 9/2005 | Bridgelall | |
| 2006/0229014 A1 | 10/2006 | Harada et al. | |
| 2007/0076640 A1 | 4/2007 | Bonta et al. | |
| 2007/0105497 A1 | 5/2007 | Ritala | |
| 2007/0258393 A1 | 11/2007 | Cam-Winget et al. | |
| 2007/0264991 A1 | 11/2007 | Jones et al. | |
| 2007/0287399 A1 | 12/2007 | Lee | |
| 2007/0287421 A1 | 12/2007 | Kirke | |
| 2008/0002639 A1 | 1/2008 | Hummer | |
| 2008/0194205 A1 | 8/2008 | Kusakari | |

FOREIGN PATENT DOCUMENTS

| | | |
|---|---|---|
| EP | 1447944 A2 | 8/2004 |
| EP | 1450517 A1 | 8/2004 |
| EP | 1507362 A1 | 2/2005 |
| EP | 1873982 A2 | 1/2008 |
| EP | 2130327 B1 | 11/2012 |
| EP | 2547044 A2 | 1/2013 |
| JP | 2004254311 | 9/2004 |
| JP | 2005064855 | 3/2005 |
| JP | 2005109745 | 4/2005 |
| JP | 2006319946 | 11/2006 |
| JP | 2008228271 | 9/2008 |
| JP | 5001423 | 5/2012 |
| KR | 20040074966 | 8/2004 |
| KR | 20040108676 | 12/2004 |
| KR | 1020120044995 | 5/2012 |
| KR | 1156321 | 6/2012 |
| WO | WO03003610 A1 | 1/2003 |
| WO | 03039023 A1 | 5/2003 |
| WO | 03081373 A2 | 10/2003 |
| WO | 03100348 A1 | 12/2003 |
| WO | 2008119150 A1 | 10/2008 |

OTHER PUBLICATIONS

"bluez-utils-3.9-9 RPM for ppc", available at http://rpmfind.net/linux/RPM/opensuse/OSS-factory/pcc/bluez-utils-3.9-9.ppc.html as retrieved on Mar. 19, 2007.
AirDefense BlueWatch, http://www.airdefense.net/products/bluewatch/index.php, Nov. 21, 2007.
iStumbler Release 98, Feb. 4, 2007, http://www.istumbler.net/.
Retina Network Security Scanner, http://www.eeye.com/html/products/retina/index.html, Nov. 21, 2007.
Network Chemistry BlueScanner, Oct. 17, 2005, http://www.networkchemistry.com/news/BlueScanner_10_17_05.pdf.
Phifer, L., "Don't get bitten by Bluetooth", Nov. 17, 2005, http://searchsecurtiy.techtarget.com/tip/1,289483, sid14_gci1148951,00.html.
International Search Report for International Application No. PCT/CA2007/001535, dated Dec. 21, 2007.
European Intent to Grant for European Patent Application No. 07800559.2, dated Jun. 6, 2012.
Japanese Certificate of Patent for Japanese Patent Application No. 2010-500029, dated May 25, 2012.
Canadian Office Action for Canadian Patent Application No. 2,681,956, dated Aug. 1, 2012.
Japanese Notice of Allowance for Japanese Patent Application No. 2010-500029, dated Apr. 19, 2012.
European Response for European Patent Application No. 07800559.2, dated Jan. 18, 2012.
European Amendment for European Patent Application No. 07800559.2, dated Feb. 3, 2011.
Korean Notice of Allowance for Korean Patent Application No. 10-2009-7022695, dated Mar. 8, 2012.
Chinese Notification of Grant for Chinese Patent Application No. 200780053088.1, dated May 9, 2012.
Korean Final Rejection for Korean Patent Application No. 10-2009-7022695, dated Nov. 25, 2011.
Japanese Office Action for Japanese Patent Application No. 2010-5000029, dated Dec. 14, 2011.
European Examination Report for European Patent Application No. 07800559.2, dated Sep. 27, 2011.
Chinese Office Action for Chinese Patent Application No. 200780053088.1, dated Aug. 10, 2011.
Korean Office Action for Korean Patent Application No. 2009-7022695, dated May 2, 2011.
European Search Report for European Patent Application No. 07800559.2, dated Nov. 12, 2010.
Canadian Office Action for Canadian Patent Application No. 2,681,956, dated Mar. 7, 2013.
European Certificate of Grant for European Patent Application No. 07800559.2, dated Nov. 14, 2012.
Korean Certificate of Grant for Korean Patent Application No. 10-2009-7022695, dated Jun. 7, 2012.
European Decision to Grant for European Patent Application No. 07800559.2, dated Oct. 18, 2012.
Extended European Search Report for European Patent Application No. 12188135.3 dated Jan. 28, 2013.
Prosecution documents for U.S. Appl. No. 12/815,701 issued as United Sates Patent No. 8,364,088.
Prosecution documents for U.S. Appl. No. 11/693,385 issued as United Sates Patent No. 7,747,223.
Document relating to CA Application No. 2,681,956 dated Sep. 26, 2013 (Notice of Allowance).
Document relating to EP Application No. 12188135.3, dated Jul. 17, 2013 (Office Action Response).
Document relating to HK Application No. 10105518.0, dated Jul. 16, 2013 (Certificate of Patent).
Document relating to JP Application No. 2012-113470, dated Sep. 13, 2013 (Office Action).
Document relating to EP Application No. 12188135.3 dated Oct. 3, 2013, (Communication Pursuant to Article 94(3) EPC).

* cited by examiner

METHOD, SYSTEM AND MOBILE DEVICE FOR PRIORITIZING A DISCOVERED DEVICE LIST

CROSS REFERENCE TO RELATED APPLICATIONS

This application is continuation of U.S. patent application Ser. No. 12/815,701, filed on Jun. 15, 2010, which is a continuation of U.S. patent application Ser. No. 11/693,385, filed on Mar. 29, 2007. U.S. patent application Ser. No. 11/693,385 issued to patent as U.S. Pat. No. 7,747,223. The entire contents of application Ser. No. 12/815,701, and application Ser. No. 11/693,385, are hereby incorporated by reference.

TECHNICAL FIELD

The described embodiments relate to methods, systems and mobile devices for prioritizing a discovered device list. In particular, the methods, systems and mobile devices are prioritized in the discovered device list based on the received signal strength of signals received from devices within a Wireless Personal Area Network (WPAN).

BACKGROUND

For computing devices employing a WPAN technology, it is possible to communicate with other devices in a local area, provided such devices are similarly enabled for WPAN communication. In order for devices to communicate with each other within a WPAN, it is necessary to form a connection between the devices, so that they recognize each other.

There are many different varieties of devices that are enabled for communication in a WPAN environment. Some such devices are sophisticated enough to be able to initiate formation of a connection with another device in the WPAN, while other devices are not. Devices that can initiate formation of a connection will generally maintain a list of devices with which a connection has been formed. In order to add a new device to the list of connected devices, it is necessary to search the WPAN area to find all "discoverable" devices, i.e. those devices with which the searching device can be connected for communication within the WPAN. In a densely populated WPAN, a large number of devices may be discovered in the search. In existing WPAN technologies, when searching for discoverable devices, the searching device will present a list of all discovered devices to the user so that the user can select one device for connecting with the searching device. The list presented to the user is ordered according to the time at which a response was received, with the device that first responded to the search being listed first in the list of discovered devices.

Once all discoverable devices in the WPAN area have responded to the search and are listed in the discovered device list, the searching device then communicates with each device in sequence to determine the "friendly name" of the device. The friendly name of the device may be a name given to that device by its user, such as "Fred's laptop", "Sarah's headset" or "Jack's cell phone". The friendly name of the device is often the only way that a user can recognize which device among the many listed is the one that the user wants to connect his or her device with. Obtaining the friendly name of each device can take a few seconds, so it can take some time to retrieve all of the friendly names so that a user can select the correct device with which to initiate formation of a connection.

The described embodiments attempt to address or ameliorate one or more shortcomings or disadvantages associated with existing WPAN technologies, or to at least provide a useful alternative thereto.

BRIEF DESCRIPTION OF THE DRAWINGS

Features and functions of the embodiments are described in further detail below, with reference to the accompanying drawings, and by way of example, wherein.

DETAILED DESCRIPTION

The embodiments described herein relate generally to methods, systems and computing devices, including at least a mobile device, for prioritizing a discovered device list according to a Received Signal Strength Indication (RSSI) of each device in the discovered device list. Thus, the discovered device list has at the top of the list the device that has the highest RSSI, with the remaining devices in the discovered device list presented in descending order of RSSI.

The embodiments described herein assume that the device displaying the discovered device list is configured to initiate a search for discovered devices within a WPAN area and to initiate formation of a connection with one such discovered device. For simplicity of description and illustration, we will refer to the device configured to search and pair with other devices as the searching device. Further, as one example of a searching device, we will describe the embodiments as applied in the context of the searching device being a mobile device, although the searching device may be any other suitable computing device, such as a laptop computer or desktop computer, capable of searching for discovered devices and initiating formation of a connection with one such device.

Certain embodiments relate to a method of ordering a list of discovered devices in a wireless personal area network (WPAN), comprising: receiving at a first device a plurality of wireless device signals from respective devices in the WPAN; determining a received signal strength of each of the wireless device signals; and displaying on a display of the first device a list of devices corresponding to the devices from which the wireless device signals were received, wherein the devices in the list are ordered according to the received signal strength of the wireless device signal of the respective device.

The wireless device signals may be received in response to a page signal transmitted from the first device. The first device may transmit the page signal in response to a selection on the first device to add one of the plurality of devices to a connected device list.

The method may further comprise requesting by the first device a name of each device in the list in sequence from the top of the list to the bottom of the list until all device names have been received for the plurality of the devices or until a selection is made that cancels requesting the device names, wherein once the name of a respective device is received by the first device, the name of the device is displayed in the list on the display. The selection may comprise selecting a named device in the list of devices. The method may further comprise initiating a device connection between the first device and the named device in response to the selection.

The method may further comprise determining a device identifier and a device class of each of the plurality of devices based on the respective wireless device signals. For devices in the list having a same received signal strength, such devices may be ordered in the list according to the device class of each such device. An icon may be displayed for each device in the list, the icon corresponding to the device class of the respective device.

The first device may be a mobile device or a personal computer. A communication technology of the WPAN may be selected from the group consisting of: Bluetooth®, ZigBee®, wireless universal serial bus (WUSB), ultra-wideband (UWB) and IEEE 802.15.4 compliant technologies.

Other embodiments may include a device for ordering a list of discovered devices in a wireless personal area network (WPAN). The device comprises: a processor; a display responsive to the processor; a short-range communication subsystem coupled to the processor for enabling communication between the device and a plurality of other devices in the WPAN; and a memory storing program code executable by the processor. The program code comprises a WPAN management module which, when executed by the processor, causes the processor: to determine a received signal strength of each of a plurality of wireless device signals received by the short-range communication subsystem from respective ones of the plurality of other devices and to cause the display to display a list of the other devices. The other devices are ordered in the list according to the received signal strength of the wireless device signal of the respective other device.

The processor may be configured to control the short-range communication subsystem to transmit a page signal to the other devices and the plurality of wireless device signals may be received in response to the page signal. The page signal may be transmitted in response to selection of an "add device" option displayed on the display.

WPAN management module may be further configured, when executed by the processor, to cause the processor to request a name of each other device in the list in sequence from the top of the list to the bottom of the list until the names of all of the other devices have been received or until a selection is made that cancels the request, wherein once the name of a respective other device is received, the name of the other device is displayed in the list on the display. The device selection may comprise selecting a named device in the list of devices. The WPAN management module may be further configured to initiate device connection between the first device and the named device in response to the selection.

The WPAN management module may further cause the processor to determine a device identifier and a device class of each of the other devices based on the respective wireless device signals received from the other devices. For devices in the list having a same received signal strength, such devices are ordered in the list according to the device class of each such device. The WPAN management module may cause an icon to be displayed on the display for each other device in the list, wherein the icon corresponds to the device class of the respective other device.

The device may be a mobile device or a personal computer. A communication technology of the WPAN may be selected from the group consisting of: Bluetooth®, ZigBee®, wireless universal serial bus (WUSB), ultra-wideband (UWB) and IEEE 802.15.4 compliant technologies.

Other embodiments relate to a computer readable storage storing program instructions which, when executed by a processor, cause the processor to perform a method of ordering a list of discovered devices in a wireless personal area network (WPAN). The method comprises: receiving at a first device a plurality of wireless device signals from respective devices in the WPAN; determining a received signal strength of each of the wireless device signals; and displaying on a display of the first device a list of devices corresponding to the devices from which the wireless device signals were received, wherein the devices in the list are ordered according to the received signal strength of the wireless device signal of the respective device.

Figure 1:
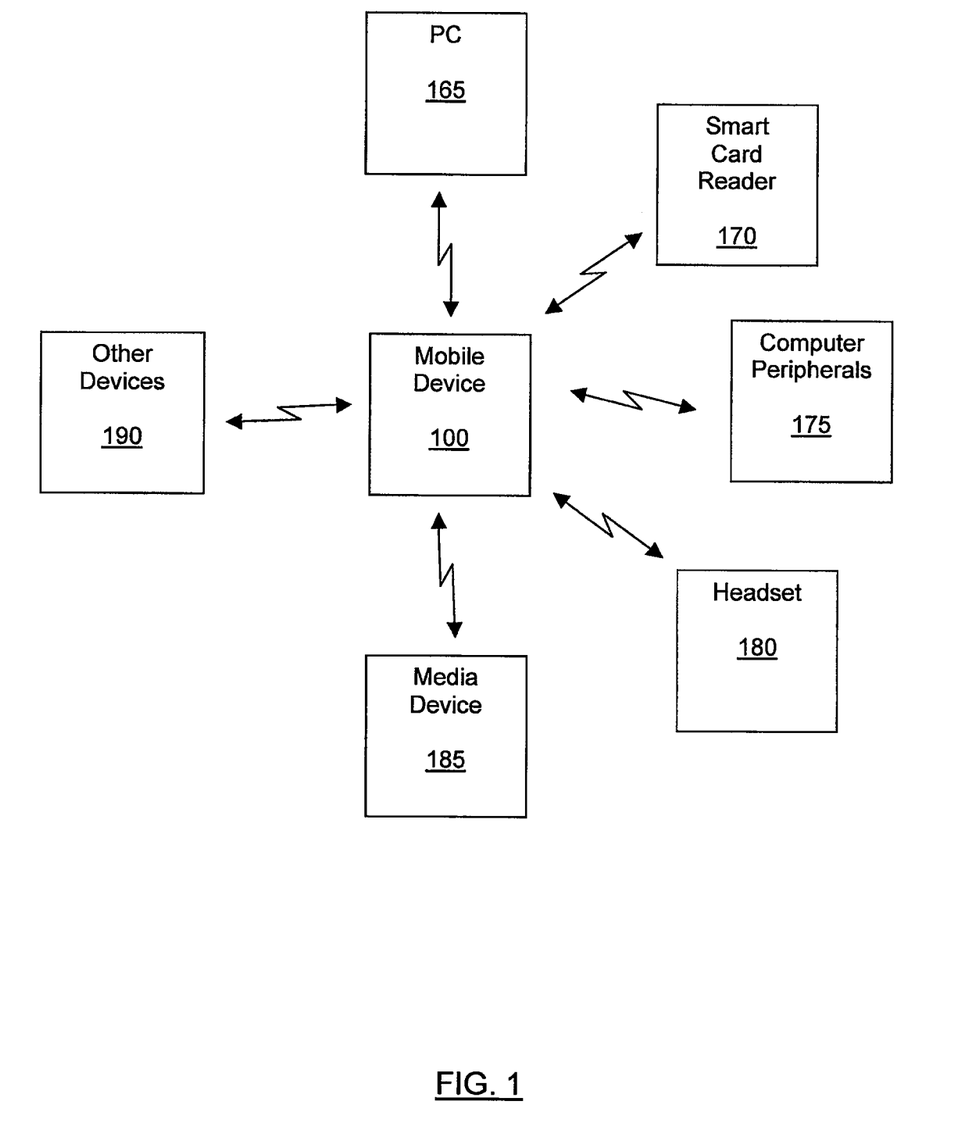
FIG. 1 is a block diagram of a mobile device communicating with other devices in a WPAN environment.
Figure 2:
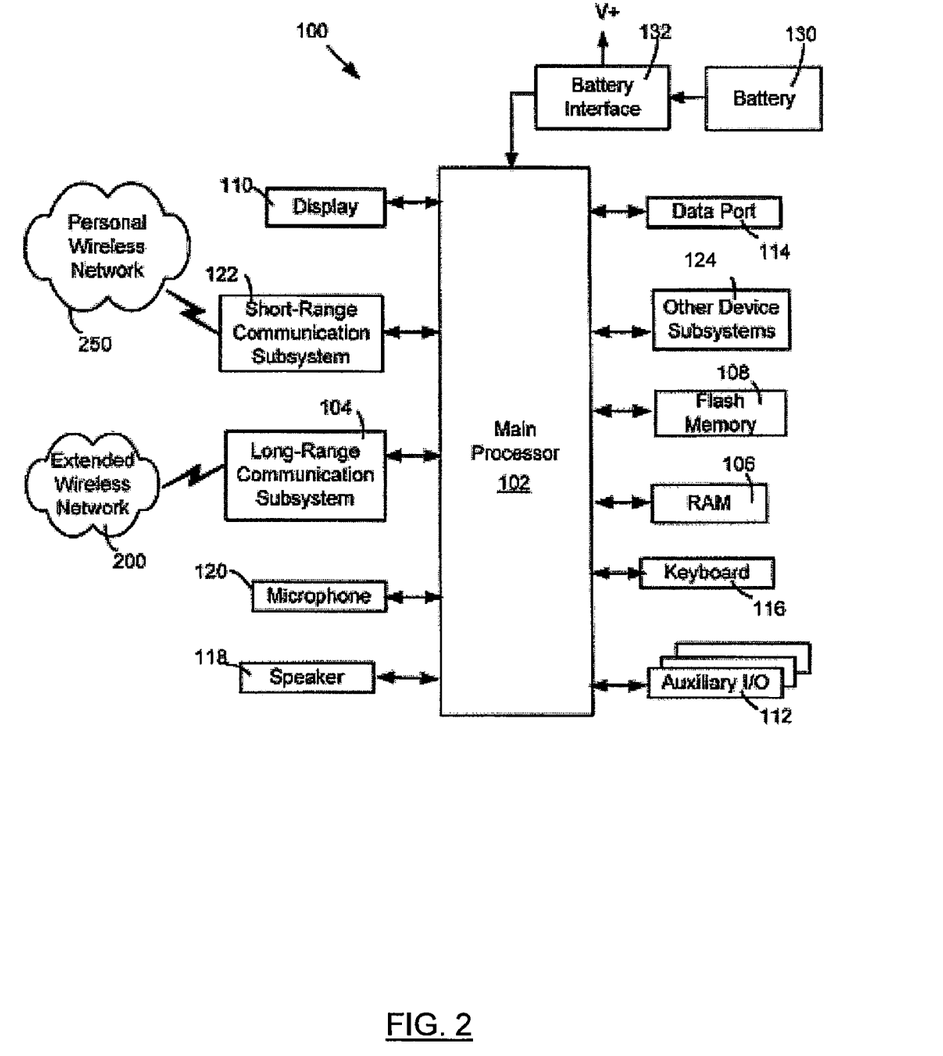
FIG. 2 is a block diagram of an exemplary embodiment of a mobile device.
Figure 3:
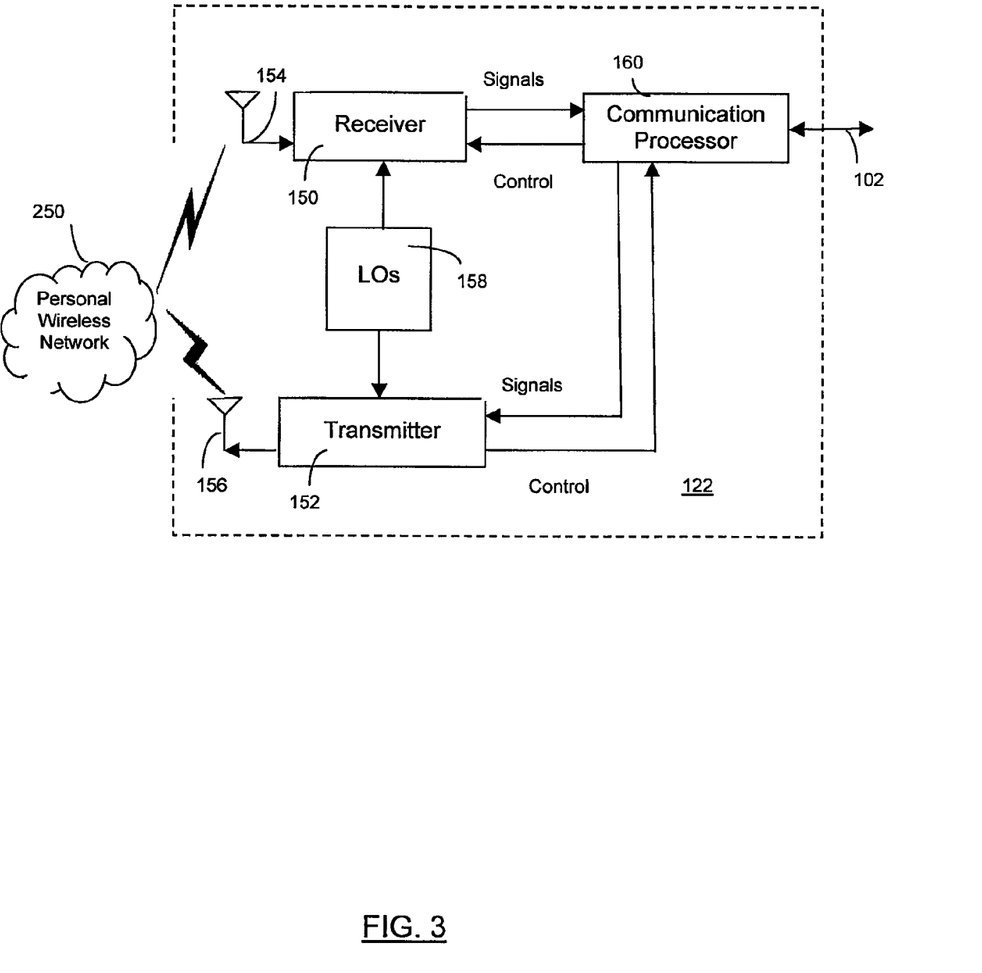
FIG. 3 is a block diagram of an exemplary embodiment of a communication subsystem of the mobile device of FIG. 2.

To aid the reader in understanding the general structure of the mobile device and how it communicates with other devices and host systems, reference is now made to FIGS. 1-3.

FIG. 1 is an illustrative block diagram of a mobile device 100 communicating with other devices in a Wireless Personal Area Network (WPAN) environment. The other devices may include one or more of: a personal computer (PC) 165, a smart card reader 170, one or more computer peripherals 175, a head set 180, a media device 185 and other devices 190.

The PC 165 may comprise a desktop computer or a laptop, for example. Computer peripherals 175 may include suitable wirelessly enabled peripherals, such as a mouse, keyboard, display and printer, for example. The headset 180 may be a suitable audio device with an audio pick-up and speaker. Media device 185 may be a suitable device for capturing and/or storing and/or displaying/outputting media such as audio, video, image or text data. Examples of media device 185 may include a digital camera and a digital music system. Other devices 190 may include a variety of suitable wirelessly enabled devices having different functions or features for interacting with mobile device 100. For example, other devices 190 may include a universal serial bus (USB) adapter. More than one of any of devices 100 and 165 to 190 may be present within the WPAN environment.

In the block diagram depicted in FIG. 1, mobile device 100 and devices 165 to 190 are all located within the WPAN area within range of mobile device 100. In the embodiments described herein, mobile device 100 is the searching device and is configured to communicate wirelessly with any of the devices 165 to 190 using a wireless personal network technology supported by the devices. Examples of such wireless personal network technologies include communication standards compliant with the IEEE 802.15.4 specifications and include Bluetooth®, ZigBee®, wireless USB (WUSB) and ultra-wideband (UWB) radio technologies. Other suitable wireless personal network technologies may be employed, as appropriate.

The typical communication range of a WPAN is about 10 meters from the searching device, although some devices may be able to transmit at higher power and have a longer range, for example up to about 100 meters.

Referring to FIG. 2, shown therein is a block diagram of an exemplary embodiment of mobile device 100. The mobile device 100 includes a number of components such as a main processor 102 that controls the overall operation of the mobile device 100. Communication with a wide-area or local-area network, including data, and in alternative embodiments voice communication, are performed through a long-range communication subsystem 104. The long-range communication subsystem 104 can receive messages from, and send messages to, an extended wireless network 200. In this exemplary embodiment of the mobile device 100, the communication subsystem 104 can be configured in accordance with the IEEE 802.11 standard. Accordingly, the wireless link connecting the communication subsystem 104 with the wireless network 200 represents one or more different Radio Frequency (RF) channels, operating according to defined protocols specified for IEEE 802.11 communication. Those skilled in the art are familiar with various implementations of the extended wireless network 200.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a short-range communication subsystem 122 and other device subsystems 114. The mobile device 100 can be battery powered and include corresponding components such as one or more batteries 130 and a battery interface 132, as is commonly known by those skilled in the art.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the extended wireless network 200, and device-resident functions such as a calculator or task list.

The auxiliary I/O subsystem 112 may include one or more components such as: a touch screen, mouse, track ball, an infrared, capacitive or optical fingerprint detector, or a multi-direction actuator (navigation component), such as a track ball, joystick, directional pad or roller wheel, with dynamic button pressing capability. The keyboard 116 is preferably an alphanumeric keyboard and/or telephone-type keypad. However, other types of keyboards may also be used. The button pressing capability of the multi-direction actuator may be used to effect a selection of an item highlighted or emphasized on display 110.

The mobile device 100 can send and receive communication signals over the extended wireless network 200 after required network registration or activation procedures have been completed. Network access is associated with a unique identifier for the mobile device 100, or a subscriber or user of the mobile device 100 as is commonly known by those skilled in the art such as using Subscriber Identity Module or Removable User Interface Module. For strict IEEE 802.11 communication, this unique identifier appears as the Medium Access Controller (MAC) address of the WLAN radio, and additional network handshaking involving security credentials may be required to ensure full communication with the wireless network 200, as is known by those skilled in the art.

The mobile device 100 is a battery-powered device. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system along with software programs for various applications that are executed by the main processor 102. The operating system and software programs are stored in a persistent store such as the flash memory 108, which may be an alternative form of read-only memory (ROM) or similar storage element (not shown). Portions of the operating system and other software components, such as specific device applications, or parts thereof, may be temporarily loaded into a volatile store such as RAM 106. Other software components can also be stored in flash memory 108 to suit the functional requirements of mobile device 100. Such software components may include, for example, a message application for sending and receiving electronic messages, an address book, a personal information manager, a device state module and other suitable programs.

Additional software components can be loaded onto the mobile device 100 through at least one of the extended wireless network 200, the auxiliary I/O subsystem 112, the data port 114, the short-range communication subsystem 122, or any other suitable device subsystem 124. This flexibility in software application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery (not shown) of the mobile device 100.

The short-range communication subsystem 122 provides for communication between the mobile device 100 and different systems or devices within a designated group such as a Personal Wireless Network 250, without the use of the extended wireless network 200. For example, the Personal Wireless Network 250 may be embodied as a WPAN. In some cases, the short-range subsystem 122 can include a Bluetooth® radio, a ZigBee® device, a Wireless USB device, or an Ultra-Wideband (UWB) radio, for example. Examples of short-range communication standards include the Infrared Data Association (IrDA), Bluetooth®, ZigBee®, WUSB, UWB and the IEEE 802.15 standards.

Referring now to FIG. 3, a block diagram of an exemplary embodiment of the short-range communication subsystem component 122 is shown. The short-range communication subsystem 122 comprises a WPAN radio that includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the short-range communication subsystem 122 is dependent upon the personal wireless network 250 with which the mobile device 100 is intended to operate. Thus, it should be understood that the features and configuration of short-range communication subsystem 122 illustrated in FIG. 3 serve only as one possible example.

Signals received by the antenna 154 through the wireless network 250 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless personal network 250 via the antenna 156. The DSP 160 can process communication signals, and can provide for receiver and transmitter control. For example, the gains applied to communication signals in the receiver 150 and the transmitter 152 may be adaptively controlled through automatic gain control algorithms implemented in the DSP 160.

The wireless communication between the mobile device 100 and devices 165 to 190 in the wireless personal network 250 may be performed over one or more different channels, typically different RF channels. Known communication protocols for WPANs are used for communication between the mobile device 100 and devices 165 to 190 in the wireless personal network 250. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless personal network 250 and is otherwise turned off to conserve resources. Similarly, the receiver 150 is periodically turned off to conserve power until it is needed to receive signals or information (if at all) during designated time periods.

Figure 4:
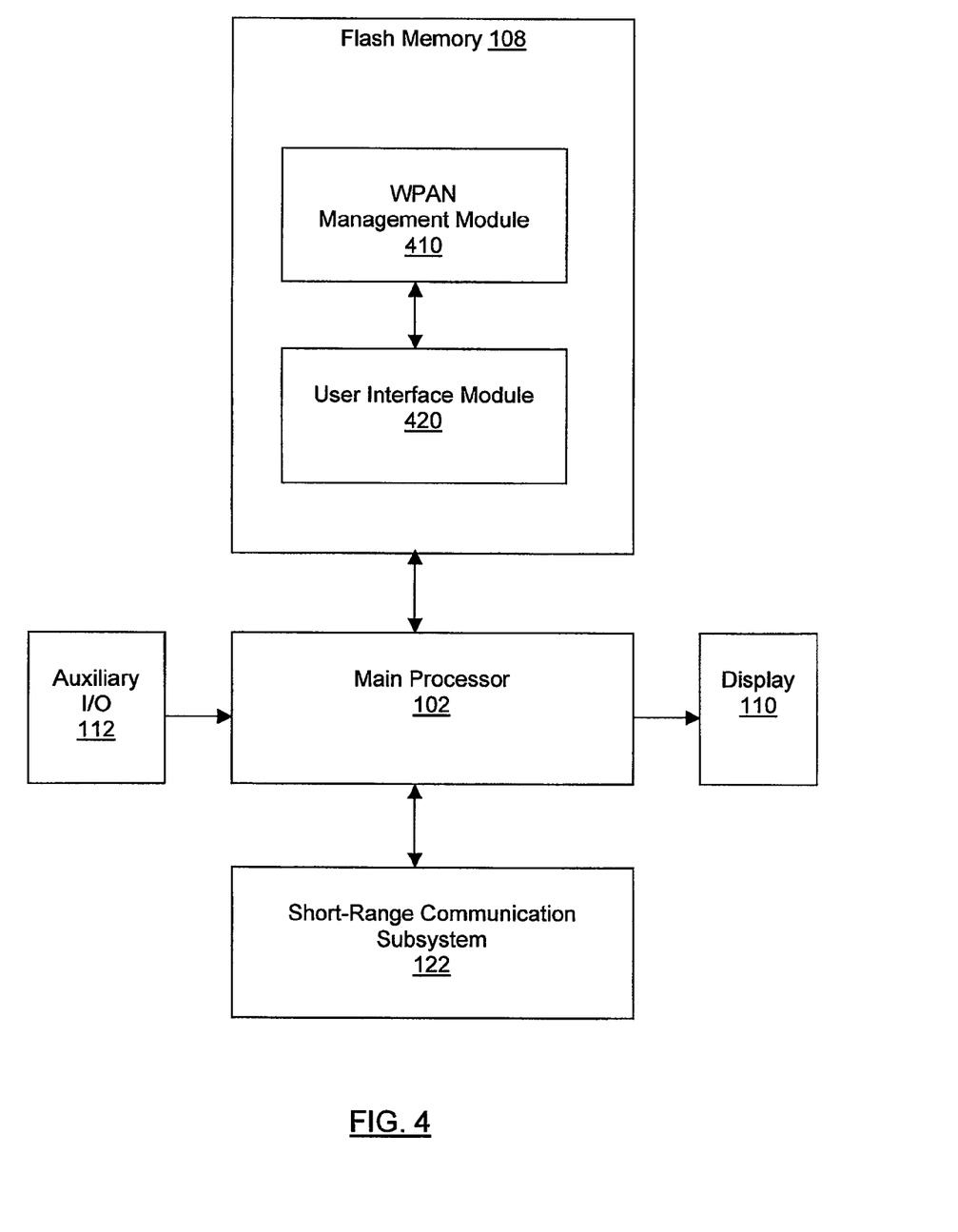
FIG. 4 is a block diagram showing certain components of the mobile device of FIG. 2 in greater detail.

Referring now to FIG. 4, certain components of mobile device 100 are shown and described in further detail. In particular, flash memory 108 is shown comprising a WPAN management module 410 and a user interface module 420, stored as executable program code. The functions of WPAN management module 410 and user interface module 420 are performed by main processor 102 executing the relevant stored program code in flash memory 108. Flash memory 108 comprises various other program code, such as operating system software and other software applications, although these are not specifically shown for purposes of simplicity of illustration.

For purposes of illustration only, WPAN management module 410 is described herein in the context of the Bluetooth® WPAN network technology as one example of a wireless personal network technology. WPAN management module 410 is an application that can be enabled or disabled by a user according to options provided by user interface module 420 on display 110. Once enabled, WPAN management module 410 mostly runs in the background, automatically communicating with other devices in the WPAN area when within range, if mobile device 100 has already connected to (paired with) such devices. However, if the user wishes to enable mobile device 100 to communicate with a device with which it has not yet been paired, the user can select an "add device" option from within a WPAN management home screen 610 (FIG. 6) caused by user interface module 420 to be displayed on display 110. The "add device" option may be available from a screen displaying a connected (paired) device list for devices with which mobile device 100 has already been paired.

Figure 6:
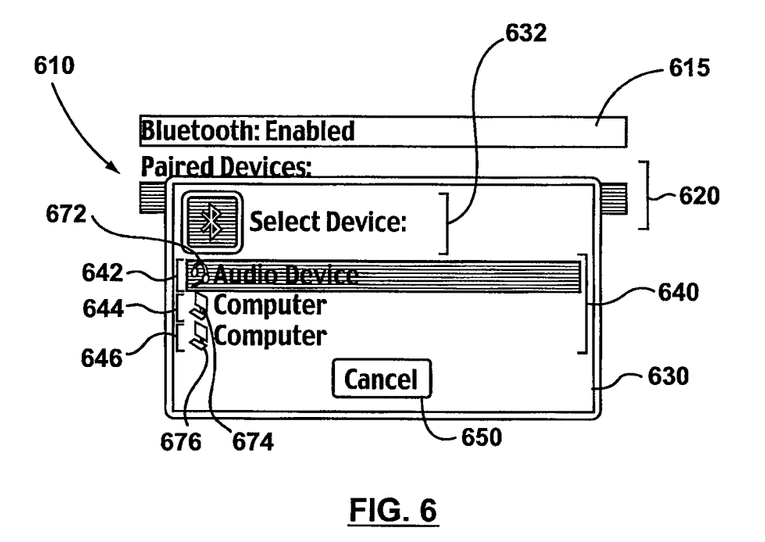
FIG. 6 is an example screen shot of a display of a list of discovered devices where the discovered devices are not named.

If the user selects the "add device" option, mobile device 100 will cause short-range communication subsystem 122 to send out a page signal receivable by other devices within the WPAN area. Once all devices in the area respond to the page signal, they will be sorted according to descending RSSI value and displayed in a list 640 of discovered devices, such as is illustrated in FIG. 6.

Responses received from devices in the WPAN area in response to the page signal comprise the MAC address (which is a unique identifier of the device) and device class of the responding device. The WPAN management module 410 also causes short-range communication subsystem 122 to determine a received signal strength indication (RSSI) of each such response and to provide all such information from the received response signals to the WPAN management module 410. By comparing the RSSI of each wireless signal received from the respective devices in the WPAN area, WPAN management module 410 sorts and orders the list of discovered devices according to the relative strength of the received signal (i.e. the RSSI value). Thus, devices within the WPAN area will be listed in discovered device list 640 in descending order from highest RSSI to lowest RSSI.

On the assumption that a device having close proximity to the searching device is more likely to be the one with which the user wishes to pair mobile device 100, ordering the discovered device list 640 by RSSI places those devices that are likely to be closest to mobile device 100 at the top of discovered device list 640. Although RSSI is not a precise indication of proximity, there is at least a good correlation between RSSI and proximity. Where devices within the WPAN area all have a similar communication range, the RSSI of the received signal from such devices will generally be a reliable indication of proximity.

Figure 7:
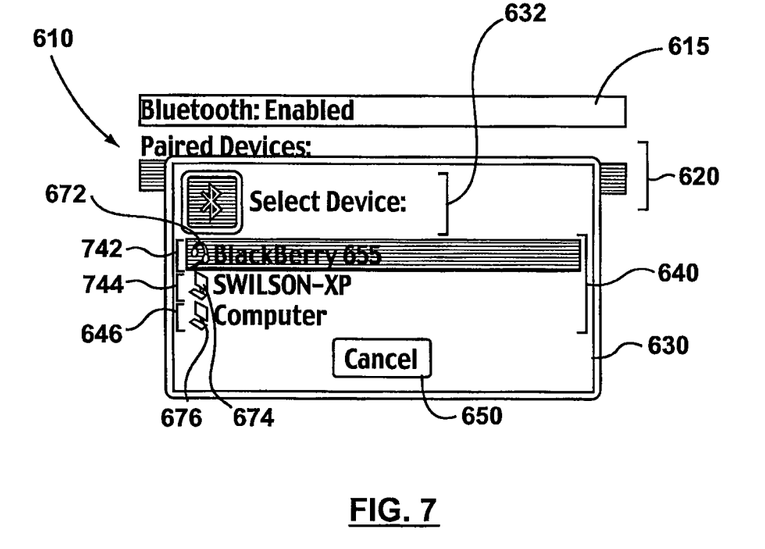
FIG. 7 is a further example screen shot of a display of the list of discovered devices, where some of the discovered devices are named.

WPAN management module 410 also handles interfacing between the user interface module 420 and the wireless communications framework of device 100, including short-range communications subsystem 122. Additionally, WPAN management module 410 cooperates with user interface module 420 to display status information to the user and to interpret input received from the user in relation to graphical elements provided on display 110. FIGS. 6 and 7 show example screen shots of display 110 as generated by user interface module 420 based on information and/or function calls received from WPAN management module 410. The functions of WPAN management module 410 and features thereof are described in further detail below with reference to FIGS. 5 to 7.

The main processor 102, display 110, auxiliary I/O 112 and short range communication subsystem 122 as shown in FIG. 4 have the same features and functions as described above in relation to FIG. 2 and FIG. 3. User input, including selection input and navigation input, may be received via an appropriate component of auxiliary I/O 112.

Figure 5:
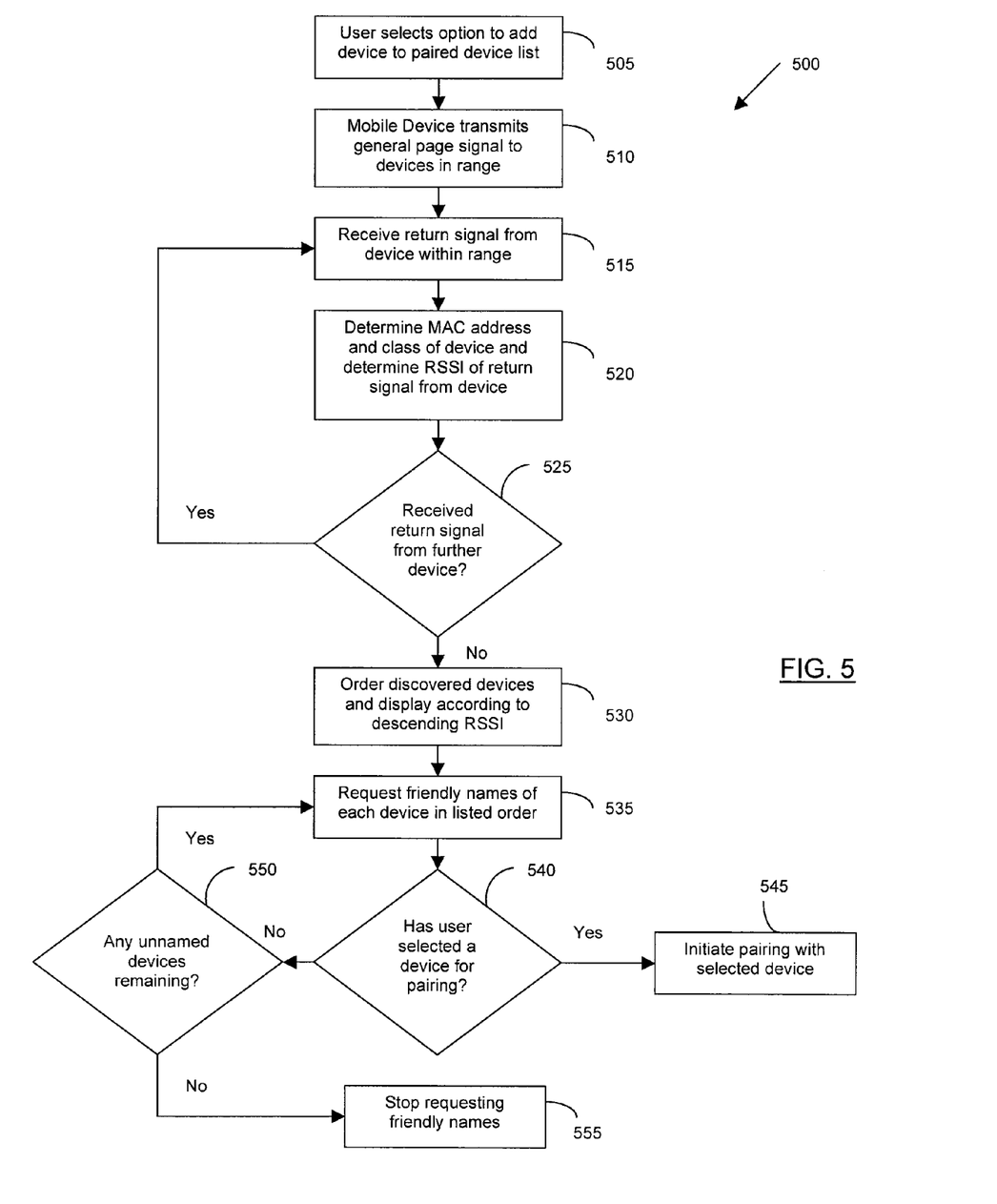
FIG. 5 is a flow chart of a method of ordering a discovered device list.

Referring now to FIG. 5, there is shown a method 500 of ordering a discovered device list. Method 500 begins at step 505, at which a user selects the option to add a device to the paired device list. The paired device list is saved in flash memory 108 or another persistent store and accessible to WPAN management module 410. In response to selection of the "add device" option at step 505, main processor 102 causes short-range communication subsystem 122 to transmit a general page signal to other devices in the WPAN area, at step 510. This page signal is a standard signal specified under the IEEE 802.15.4 standard. Essentially, the page signal is an invitation to each device in the area to respond and make its presence known to the searching device.

At step 515, mobile device 100 receives at the short-range communication subsystem 122 return signals from one or more of devices 165 to 190. The return signals received in this respect will usually include information about the device that is responding to the page signal. Such information will usually include the MAC address and class of the device providing the return signal. At step 520, WPAN management module 410 cooperates with short-range communication subsystem 122 to determine the MAC address and device class from each received return signal. Additionally, the short-range communication subsystem 122 measures the received signal strength to determine the RSSI of each received return signal and provides the RSSI value to WPAN management module 410.

As each return signal is received from the devices in the WPAN area, step 520 is performed to determine the MAC address, device class and RSSI of the return signal.

Steps 515 to 525 are performed in relation to each return signal received from one of devices 165 to 190 in response to the page signal. Thus, while mobile device 100 continues to receive return signals from further devices at step 530, steps 515 to 525 are repeated for the newly received return signals. Once WPAN management module 410 determines at step 525 that no further return signals have been received, for example by waiting a predetermined time and then concluding that if a return signal is not received within that time, such a signal will not be sent.

At step 530, the devices from which a return signal was received are displayed as "discovered devices" in discovered device list 640 on display 110. Prior to displaying the discovered device list 640, WPAN management module 410 sorts the devices in the list according to the received signal strength (i.e. RSSI value) so that the device having the highest received signal strength is listed at the top of the discovered device list 640 and the remaining devices are displayed in descending order of received signal strength.

Once the discovered device list 640 is displayed at step 530, then at step 535, WPAN management module 410 instructs short-range communication system 122 to transmit a request to each of the devices in the discovered device list to provide the "friendly name" of the device, at step 535.

In alternative embodiments, the discovered device list 640 may be displayed and updated as each return signal is received from a discovered device, with the order of the list being re-sorted by WPAN management module 410, as necessary, to place each newly discovered device in the appropriate position in discovered device list 640.

In order for mobile device 100 to obtain the friendly name of another device, it is necessary to establish a connection with that device, which may take a few seconds for each device. Starting with the first device in the discovered device list 640, WPAN management module 410 causes short-range communication subsystem 122 to request the friendly name of each device in the discovered device list. For a discovered device list having many devices, this can take some time. Thus, the user may select one of the named devices for pairing prior to completion of the retrieval of all friendly names for all devices in the discovered device list, thereby interrupting friendly name retrieval without having to wait for all names to be retrieved. Accordingly, if, at step 540, a user has selected one of the devices in discovered device list 640 for pairing, then at step 545, WPAN management module 410 initiates pairing with the selected device. Simultaneously, WPAN management module 410 stops instructing short-range communication subsystem 122 to retrieve any further friendly names of the remaining devices in the discovered device list 640.

If no user input is received to select a device for pairing at step 540, then at step 550, WPAN management module 410 checks whether any devices in discovered device list 640 have not had their friendly names retrieved. If all friendly names have been retrieved, then at step 555 WPAN management module 410 stops requesting the friendly names. If, at step 550, one or more unnamed devices (i.e. devices for which friendly names have not been retrieved) remain in the discovered device list 640, then step 535 is repeated to obtain friendly names for such devices. Where a friendly name could not be retrieved from a device in discovered device list 640, a descriptor corresponding to the device class (e.g. "audio device" or "computer") may be used as a substitute friendly name for the relevant device.

In some embodiments, the friendly name of a device may be received with the return signal at step 515. In such embodiments, the friendly name is displayed for each device in the discovered device list 640 at step 530. Further, in such embodiments, steps 535, 550 and 555 are not performed as they are unnecessary.

Referring now to FIGS. 6 and 7, example screen shots are shown, in which a discovered device window 630 is shown, displaying discovered device list 640. FIGS. 6 and 7 show a WPAN management home screen 610 over which discovered device window 630 is displayed. WPAN management home screen 610 comprises a title bar 615, which also indicates an enablement status of WPAN communications. In the examples shown, title bar 615 reads "Bluetooth: enabled". Also shown in WPAN management home screen 610 is a paired device list 620, with one or more devices listed for which pairing with mobile device 100 has already been completed. In the examples shown in FIGS. 6 and 7, paired device list 620 has nil items in the list.

Discovered device window 630 is displayed in response to the selection of the "add device" option, which can be selected as a menu item that can be generated while viewing the WPAN management home screen 610. Discovered device window 630 comprises instructional text 632 located toward the top of the window 630 and above discovered device list 640. In the examples shown, the instructional text 632 is "select device:". Discovered device window 630 also includes a "cancel" option 650 to enable the user to cancel addition of a device to the paired devices list 620, for example where the desired device is not shown in the discovered device list 640.

In some embodiments (not shown), once the "add device" option is selected, but prior to display of the discovered device list 640, discovered device window 630 is displayed while the search for discoverable devices is performed. In such embodiments, discovered device window 630 shows a running count of the number of devices discovered in the search and a progress bar that illustrates progress through a searching period of, say, 10 seconds. While the WPAN management module 410 compiles the discovered device list 640 (prior to displaying it), instructional text 632 may be "searching for devices". "Cancel" option 650 may also be selected prior to display of discovered device list 640 to cancel searching for discoverable devices. If so selected, the discovered device list 640 will be displayed with only those devices (if any) that were discovered prior to selection of "cancel" option 650. If no devices were discovered, the user may be notified of this and returned to the WPAN management home screen 610.

As shown in FIG. 6, discovered device list 640 comprises a first list item 642, a second list item 644 and a third list item 646. Discovered device list 640 may have more or less than three list items, but three are shown and described for illustration purposes. Each list item in discovered device list 640 is displayed in a separate row across discovered device window 630 and comprises a descriptor, such as "audio device" or "computer", corresponding to the class of the device indicated by the relevant list item. Each list item also comprises a descriptor device icon 672, 674 and 676 displayed adjacent to the descriptor for each of the first, second and third list items 642, 644 and 646. The device icon comprises a graphical representation of the device descriptor, as defined by the class of the device.

For the example shown in FIG. 6, first list item 642 shows a device icon 672 that is a graphical depiction of an audio device and the descriptor for first list item 642 is "audio device". Second and third list items 644 and 646 display the same device icon 674, 676 and the descriptor "computer" as they are both PC devices 165. As the discovered device corresponding to the first list item 642 has the highest RSSI value, it is displayed at the top of device list 640. In the example shown in FIG. 6, the friendly names of the devices and discovered devices 640 have not yet been retrieved.

Referring also now to FIG. 7, discovered device list 640 is shown, where at least some of the friendly names have been retrieved. Where the friendly name of a device in discovered device list 640 has been retrieved, the relevant list item is updated to replace the descriptor with the retrieved friendly name. Thus, as shown in FIG. 7, the first list item 642 is now an updated list item 742 showing the same class-specific device icon 672 but showing "BlackBerry 655" as the friendly name, in place of the previous descriptor "audio device". Similarly, second list item 644 now becomes an updated second list item 744 that includes the class-specific device icon 674 and the friendly name "SWilson-XP" in place of the previous descriptor "computer". In the example shown in FIG. 7, third list item 646 has not yet had its friendly name retrieved, so it has not yet been updated.

In the example shown in FIG. 7, the device named "BlackBerry 655" has the highest RSSI value and is therefore placed at the top of discovered device list 640. Accordingly, that device had its friendly name retrieved first, on the assumption that the RSSI value for that device indicated a close proximity to the searching device and that therefore there is a greater likelihood that the user would wish to have mobile device 100 pair with that device.

As shown in FIGS. 6 and 7, first list item 642, 742 is shown by default as being emphasized relative to other list items as it is at the top of discovered device list 640. In order to emphasize other list items, the user can manipulate a navigation component of mobile device 100, such as may be comprised in auxiliary I/O 112.

If discovered device list 640 were not ordered according to the received signal strength of the discovered devices, devices that respond to the page signal before the device that the user wishes to pair with mobile device 100 will appear higher on the discovered device list as it is ordered according to the time of receipt of the response signal. This may mean that the user has to wait for a number of other devices to have their friendly names retrieved before the device with which the user wishes to pair mobile device 100 has its friendly name retrieved. Such a wait may be irritating to the user.

Although some embodiments are described herein as involving "pairing" of mobile device 100 with a discovered device, such as one of devices 165 to 190, according to Bluetooth® specification, it should be understood that for other wireless personal network technologies, other forms of device connection may be formed to allow such devices to communicate with each other.

In this description, like reference numerals are used to indicate like features or elements as between the drawings appended hereto.

While the above description provides examples of the embodiments covered, it will be appreciated that some features and/or functions of the described embodiments are susceptible to modification without departing from the spirit and principals of operation of the described embodiments. Accordingly, what has been described above is intended to be illustrative of the invention and non-limiting.

The invention claimed is:

1. A non-transitory computer readable medium storing program instructions which, when executed by a processor, cause the processor to perform a method of ordering a list of discovered devices in a wireless personal area network (WPAN), the processor configured to:
    receive a plurality of received signal strength indications corresponding to wireless device signals received from devices in the WPAN; and
    display, on a user interface, a list of devices corresponding to the devices from which the wireless device signals were received, the devices in the list being ordered according to the received signal strength indications of the devices.

2. The computer readable medium of claim 1, wherein the processor is further configured to: upon receiving each received signal strength indication, sort the list according to the received signal strength indications.

3. The computer readable medium of claim 2, wherein the processor is further configured to transmit a page signal, wherein the plurality of received signal strength indications corresponding to wireless device signals is received in response to the page signal.

4. The computer readable medium of claim 3, wherein the page signal is transmitted in response to a selection to add a device to a connected device list.

5. The computer readable medium of claim 1, wherein the processor is further configured to request a name of each device in the list in sequence from the top of the list to the bottom of the list.

6. The computer readable medium of claim 5, wherein the processor is further configured to wait a predetermined time prior to requesting the name of each device in the list.

7. The computer readable medium of claim 6, wherein requesting the name of each device comprises determining whether any devices in the list do not have a device name, and requesting the name of devices in the list that do not have a device name.

8. The computer readable medium of claim 7, wherein a device class is substituted for the device name in the list, for each device for which a device name could not be retrieved.

9. The computer readable medium of claim 5, wherein the processor is further configured to receive a selection of a device in the list of devices.

10. The computer readable medium of claim 9, wherein the processor is further configured to initiate a device connection with the selected device in response to the selection.

11. The computer readable medium of claim 1, wherein the processor is further configured to receive a device identifier and a device class for each of the devices in the WPAN based on the wireless device signals.

12. The computer readable medium of claim 11, wherein devices in the list having a same received signal strength indication are ordered in the list according to the device class of each such device.

13. The computer readable medium of claim 12, wherein the processor is further configured to display an icon for each device in the list, the icon corresponding to the device class of the corresponding device.

14. The computer readable medium of claim 1, wherein a communication technology of the WPAN is selected from the group consisting of: Bluetooth®, ZigBee®, wireless universal serial bus (WUSB), ultra-wideband (UWB), and IEEE 802.15.4 compliant technologies.

15. A non-transitory computer readable medium storing program instructions which, when executed by a processor, cause the processor to perform a method of ordering a list of discovered devices in a wireless personal area network (WPAN), the processor configured to:

for each of a plurality of wireless device signals received from respective devices in the WPAN, determine a received signal strength of the wireless device signal; and     display on a display a list of devices corresponding to the devices from which the wireless device signals were received, the devices in the list being ordered according to the received signal strength of the wireless device signal of the respective device.

16. The computer readable medium of claim 15, wherein the plurality of wireless device signals is received in response to a page signal.

17. The computer readable medium of claim 16, wherein the page signal is transmitted in response to a selection to add one of the plurality of devices to a connected device list.

18. The computer readable medium of claim 15, wherein the processor is further configured to request a name of each device in the list in sequence from the top of the list to the bottom of the list until all device names have been received for the plurality of the devices or until a selection is made that cancels requesting the device names, wherein once the name of a respective device is received, the name of the device is displayed in the list on the display.

19. The computer readable medium of claim 18, wherein the selection comprises selecting a named device in the list of devices.

20. The computer readable medium of claim 19, wherein the processor is further configured to initiate a device connection with the named device in response to the selection.

21. The computer readable medium of claim 15, wherein the processor is further configured to determine a device identifier and a device class of each of the plurality of devices based on the respective wireless device signals.

22. The computer readable medium of claim 21, wherein for devices in the list having a same received signal strength, such devices are ordered in the list according to the device class of each such device.

23. The computer readable medium of claim 21, wherein the processor is further configured to display an icon for each device in the list, the icon corresponding to the device class of the respective device.

24. The computer readable medium of claim 15, wherein a communication technology of the WPAN is selected from the group consisting of: Bluetooth®, ZigBee®, wireless universal serial bus (WUSB), ultra-wideband (UWB) and IEEE 802.15.4 compliant technologies.

\* \* \* \* \*